United States Patent Office 3,124,215
Patented Mar. 10, 1964

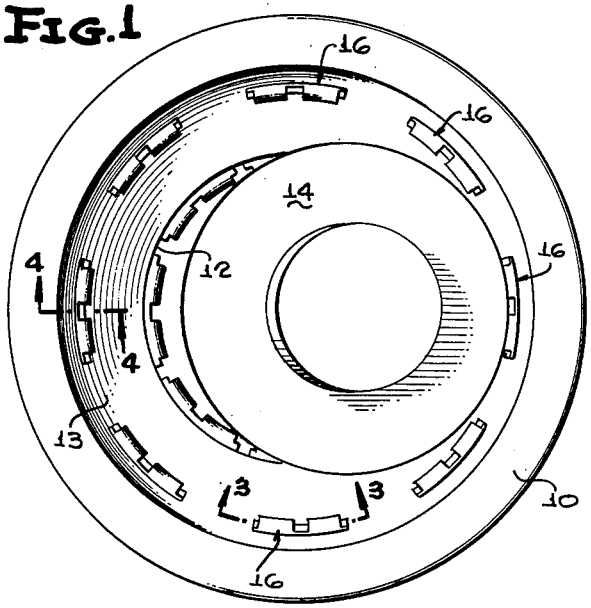
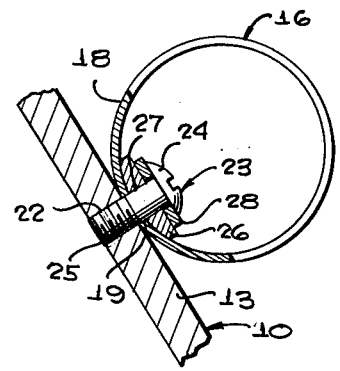
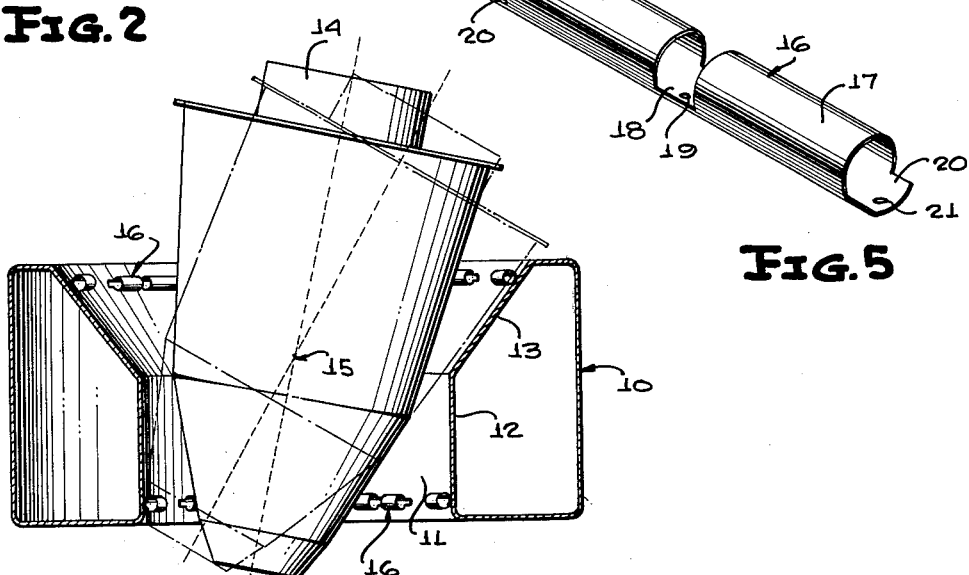
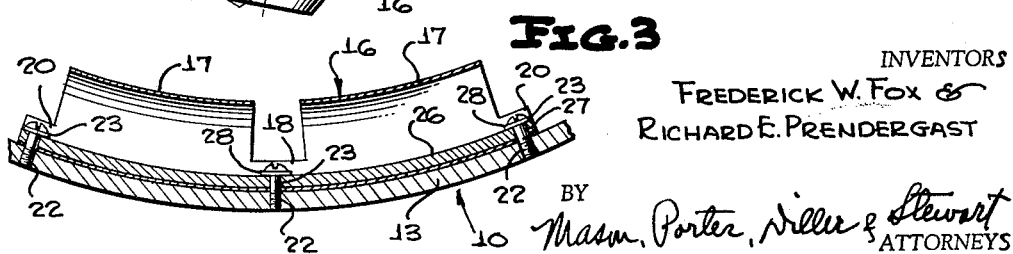

3,124,215
DISASTER STOPS COLLAPSIBLE TUBE TYPE
Frederick W. Fox, Evergreen Park, and Richard E. Prendergast, Chicago, Ill., assignors to Continental Can Company, Inc., New York, N.Y., a corporation of New York
Filed Apr. 19, 1962, Ser. No. 188,710
9 Claims. (Cl. 188—1)

This invention generally relates to protection of machine elements from a chance collision one with another and more specifically relates to the inclusion of collapsible and crushable movement decelerating and shock absorbing tubular elements disposed between the machine elements in the zones of their mutual contactability.

In some machine applications one element or component thereof may be mounted about a fixed center for oscillatable movement within the confines of another machine element having a central opening therein. The inner machine element may be extremely heavy and its movement may involve rapid accelerations and decelerations. At times, the inner element, through loss of control due either to a human error or through malfunctioning of the control equipment, may collide with its encircling machine element and thus cause serious damage to one or both of said elements. With the specific type of apparatus herein disclosed it is known to provide an emergency braking system comprising an hydraulically operated brake which is operable from the moving machine elements at speeds which approach a predetermined danger limit. Such emergency braking systems are, however, extremely expensive and must be constantly attended and maintained to assure faithful operability under emergent conditions.

The present invention deals with a disaster stop of the collapsible tube type which may be used alone or in conjunction with an emergency braking system in the event that such a system proves inadequate or fails in any particular instance. The disaster stops of the present invention are mounted on either of the two machine elements in those zones wherein the machine elements are contactable one with another. In this improved arrangement, if the control of the moving inner machine element is lost, it will then dissipate its moving kinetic energy by crushing one or more of the herein disclosed disaster stops and thus prevent harm to either of the machine elements through such a chance collision.

It is further generally known in the art of protecting machine equipment and that of protecting moving elements from the impact of collision, that a protective elastic member may be positioned at the zone of possible impact so as to reduce the collision impact between machine elements. Specifically, these prior art devices have taken the form of either spring or rubber stops. These have proven unsatisfactory for the conditions here under consideration as such stops have to be objectionably large in order to fully absorb the kinetic energy of the movable element. Furthermore, these known elastic stops tend to store energy and repel or drive the movable element in a reverse direction with accompanying bouncing prior to the element coming to a complete stop.

Another form of disaster stop is of the type that is commonly used in conjunction with commercial elevators. This type includes an endwise crushable tube which is mounted to depend from the bottom of the elevator floor or project upwardly from the floor of the elevator shaft. This endwise collapsible type of disaster stop is satisfactory where a great deal of space is available between a moving element and an element which is stationary relative thereto. These stops, however, present problems as to their vertical mounting and alignment as well as being effective only upon being engaged along their longitudinal axes by the moving element. Such stops are, therefore, useless for the machine element arrangement here under consideration which is not only closely confined as to space requirement, but also demands that the disaster stop be adapted to absorb not only the collision energy when the moving element strikes the stationary element normal to its surface, but also when the collision occurs at an angle such as would be produced by a glancing blow.

It is therefore an object of the invention to provide an improved disaster stop of the collapsible tube type which is mounted on one of two machine elements which are disposed in cooperative relationship so that upon a chance collision of one said element with the other, motive force of the moving element will be dissipated in a resulting crushing of the disaster stop.

It is also an object of the invention to provide a disaster stop which is crushable upon the chance collision of one moving machine element with another and which disaster stop is so constructed and mounted as to be readily replaceable.

Another object of the invention is the provision of an elongated, replaceable, crushable disaster stop for use with and disposition between contactable portions of two machine elements, which crushable disaster stop is formed to be mounted lengthwise on one of said machine elements in such a position that upon impact of a chance collision of one element with the other the force of the impact will be imparted along the length of the stop and across the longitudinal center thereof and will be dissipated through a crushing of the disaster stop.

A further object of the invention is the provision of a disaster stop in the form of a replaceable, crushable, and essentially inelastic element for use with and between contactable portions of two machine elements, which crushable element includes a relatively thin-walled elongated tubular portion and extensions on either end thereof through which the disaster stop may be mounted lengthwise on one of the machine elements.

A still further object of the invention is the provision of a crushable and replaceable element for use between the contactable portions of two machine elements, which crushable element comprises tandem elongated relatively thin walled tube portions composed of essentially an inelastic material, which tube portions are further axially spaced from each other by a connecting web and the ends distal from said connecting web are provided with mounting extensions.

With the above and other objects in view that will hereinafter appear, the nature of the invention will be more clearly understood by reference to the following detailed description and the accompanying drawing.

In the drawing:

FIGURE 1 is a plan view illustrating a specific apparatus embodying the present invention.

FIGURE 2 is a vertical elevational view of the apparatus of FIGURE 1 with parts being broken away and shown in section.

FIGURE 3 is a vertical longitudinal sectional view taken along the line 3—3 of FIGURE 1 and showing in particular the lengthwise disposition of a disaster stop upon one of the machine elements.

FIGURE 4 is a vertical cross-sectional view taken along the line 4—4 of FIGURE 1 and showing in particular the endwise mounting details of a disaster stop.

FIGURE 5 is an enlarged scale perspective view showing one form of the disaster stop.

Referring to the drawings, and more particularly to FIGURE 1 and thereof, an apparatus including contactable machine elements is shown, one said element being designated by the reference numeral 10. The element 10 is generally ring-like in configuration and has a central opening 11. A lower inner wall 12 of the element 10 is cylindrical in character and merges approximately midway along the height of the element in an outwardly flared upper wall section 13. Another machine element 14, is mounted within the central opening 11 and is movable within the limits of said opening about a fixed center 15. It is obvious that the extent to which the element 14 is permitted to oscillate is defined by the inner walls 12 and 13 of the element 10. The element 14 is also shaped so as to be simultaneously contactable with both the flared upper wall 13 and the lower cylindrical wall 12 of the element 10.

The construction of the disaster stops is best shown by reference to FIGURE 5 of the drawing wherein is shown the preferred embodiment of the invention. The disaster stop is generally referred to by reference numeral 16 and includes tandemly arranged tube portions 17 of generally thin walled construction and composed of an essentially inelastic material such as steel tubing. The tube portions 17 are axially spaced from each other by a connecting web 18 which has a hole 19 disposed centrally thereof and transversely therethrough. The end of each tube portion 17 distal from the connecting web 18 is provided with an extension 20 of a slightly arcuate configuration. Each extension 20 is further provided with a transversely and centrally disposed hole 21. The disaster stop 16 may, however, take the form of a single tube such as would be formed by removing one of the tandem tube portions 17 at its connection with the connecting and spacing web 18, or by eliminating the space between tube portions 17—17.

As can be best seen from FIGURES 1 and 2 of the drawing, a series of the disaster stops 16 is mounted on the inner wall portions 12 and 13 of the element 10 so as to be positioned between the elements 10 and 14 in those areas of mutual contactability. Thus, in those chance instances when the element 14 is out of control and collides with the element 10, the kinetic energy of the element 14 will be dissipated into crushing at least two of the disaster stops, one on the wall 13 and one on the wall 12; it being obvious that the moving element 14 is effectively prevented from directly contacting with the element 10 both along its upper flared wall portion 13 and its lower cylindrical wall portion 12 by said tube crushing contacts.

It should be brought out that it is not necessary that the disaster stops 16 must be mounted upon the element 10 as it is believed obvious that the effective crushing effect could equally be obtained by mounting the disaster stops 16 upon the movable element 14. The means by which the disaster stops 16 are mounted upon the element 10 may be best understood by reference to FIGURES 4 and 5 of the drawing.

Along the circumferential extent of both walls 12 and 13 of the element 10, appropriately positioned and spaced, threaded bores 22 are provided, the same being arranged in sets of three each. A disaster stop 16 is then aligned with each set of three holes provided in the walls 12 and 13 of the element 10 and held in place by screw bolts 23. The bolts 23 are of the conventional type having a slotted head 24 and a threaded extending portion 25 which threadably engages with the bores 22 formed within the walls 12 and 13 of the element 10. Thus, the aligned positioning of the disaster stops 16 along the inner walls 12 and 13 of element 10 within the zones of contactability between the elements 10 and 14 is facilitated.

The slight curved or arcuate configuration that a disaster stop 16 assumes when attached to the inner wall 13 of the element 10, by way of example and as shown in FIGURE 3, is facilitated by the inherent flexibility produced in a disaster stop 16 by means of the connecting web 18. A positioning member 26 which is provided with holes 27 for alignment with holes 19 and 21 of a disaster stop 16 is positioned in bearing engagement upon the lower inner face of a disaster stop 16 as shown in FIGURES 3 and 4. The member 26 thus aids in maintaining the position of the disaster stops 16 in relationship to the element 10. Each positioning member 26 further distributes the force of impact from glancing blows of the element 14 upon a disaster stop 16 so that the impact will be dissipated in crushing force rather than tearing a respective disaster stop 16 away from its respective mounting bolts 23 in the vicinity of the holes 19 and 21. Lock washers 28 are further disposed between the member 26 and the bolts 23 so as to prevent chance loosening of bolts 23 due to vibrational or jarring forces transmitted through the element 10.

The fabrication of the disaster stops 16 is preferably from ordinary thin walled sections of steel tubing with the desired cuts taken across the tubing diameter in the proper places so as to arrive at the configuration as shown in FIGURE 5. The diameter of the tubing, the wall thickness, and the length are best determined by means of tests for a specific piece of machinery. For instance, if it is determined that a longer distance for deceleration is required for the body 14, then the disaster stops 16 are made larger in diameter to provide this distance. Once the desirable diameter of the disaster stops has been determined, the proper wall thickness of the stops 16 is then calculated to assure that the full energy of the movable body 14 will be dissipated before the disaster stops have been completely collapsed. The length of the tubes and the wall thicknesses are correlated in that disaster stops of greater length may have thinner wall thickness and still absorb the full impact energy of the element 14.

The exact construction disclosed is not intended to be entirely restrictive in that the invention may be practiced in other ways within the scope of the appended claims.

What is claimed is:

1. In an apparatus wherein are provided a pair relatively movable elements having wall portions presented for collision contact upon undesired overtravel of one element relative to another, the combination with said elements of elongated inelastic crushable disaster stop means disposed between said wall portions and substantially normally spaced from one of said pair of elements in position for being engaged and crushed by forces applied by said one element transversely of the length of the stop means during such one element overtravel, thereby to decelerate the movement of overtravel incidental to said crushing of the stop means and dissipate impact forces prior to direct contact between said wall portions.

2. In an apparatus wherein are provided a pair relatively movable elements having wall portions presented for collision contact upon undesired overtravel of one element relative to another, the combination with said elements of elongated inelastic crushable disaster stops mounted lengthwise on one of said elements, said disaster stops being normally spaced from another of said elements and disposed between said wall portions in position for being engaged and crushed along their lengths and across their longitudinal centers during such overtravel, thereby to decelerate the movement of overtravel and dissipate impact forces prior to direct contact between said wall portions.

3. In an apparatus wherein are provided relatively moveable elements having wall portions presented for collision contact upon undesired overtravel of one element relative to another, the combination with said elements of elongated crushable disaster stops mounted lengthwise on one of said elements and disposed between said wall portions in position for being engaged and crushed along their lengths and across their longitudinal centers during such overtravel, thereby to decelerate the movement of overtravel and dissipate impact forces prior to direct contact between said wall portions, and each of said disaster stops comprising a relatively thin walled tubular element composed of essentially inelastic material.

4. The structure of claim 3 wherein each of said tubular elements is provided with an extension on either end thereof, said extensions each having a transversely disposed opening therethrough for receipt of a holding member which threadably connects the tubular element to one of said relatively movable elements.

5. In combination, a first element having a central opening therein, a second element mounted about a fixed center for movement within the central opening defined by said first element, portions of said first element and portions of said second element being simultaneously mutually contactable with each other upon an undesired overtravel of said second element and a plurality of replaceable inelastic crushable elongated tubes positioned lengthwise between said portions of mutual contactability, each of said tubes being normally in spaced non-contacting relationship to one of said elements so that during such overtravel motion force of said second element is dissipated by crushing of said tubes prior to direct contact between said first and second elements.

6. In combination, a first element of ring-like configuration having a central opening therein, one portion of said opening being defined by a cylindrical inner wall and the remaining portion of said opening defined by an outwardly flared wall, a second element mounted for oscillatory movement about a fixed center within the confines of said first element, said second element being disposed for possible simultaneous contact with an area of said cylindrical surface and an area of said flared surface, and crushable inelastic elongated tubes mounted on one of said elements in spaced non-contacting relationship to the other of said elements and engageable but crushable by contact with the other of said elements upon overtravel movement of said second element.

7. In combination, two machine elements one of which is a first element having an opening therein, the other of which is a second element mounted about a fixed center for movement within the opening defined by said first element, portions of said machine elements being contactable with each other upon undesired overtravel of one machine element relative to the other machine element, and a plurality of crushable disaster stops mounted on one of said machine elements and disposed between said portions of mutual contactability, each of said disaster stops comprising a relatively thin walled elongated tube composed of essentially inelastic material.

8. The structure of claim 7 wherein each of said crushable disaster stops is provided with an extension on either end thereof, said extensions each having a transversely disposed opening therethrough for receipt of a holding member which connects one of said disaster stops to one of said machine elements.

9. In combination, two machine elements one of which is a first element having an opening therein, the other of which is a second element mounted about a fixed center for movement within the opening defined by said first element, portions of said machine elements being contactable with each other upon undesired overtravel of one machine element relative to the other machine element, and a plurality of crushable disaster stops mounted on one of said machine elements and disposed between said portions of mutual contactability, each of said crushable disaster stops being comprised of tandemly disposed elongated relatively thin walled tubes composed of essentially inelastic material, said tubes being axially spaced from each other and connected by a web, each of said tubes being further provided with an extension at each end thereof distal from said web, said extensions and said web having a transversely disposed opening therethrough for receipt of a holding member which threadably connects one of said crushable disaster stops to one of said machine elements.

References Cited in the file of this patent

UNITED STATES PATENTS

| 2,819,060 | Neidhart | Jan. 7, 1958 |
| 2,998,214 | Peterman | Aug. 29, 1961 |

FOREIGN PATENTS

| 1,115,538 | Germany | Oct. 19, 1961 |